United States Patent [19]

Kageyama et al.

[11] Patent Number: 5,182,124
[45] Date of Patent: Jan. 26, 1993

[54] METHOD AND APPARATUS FOR PRODUCING A SHEET OF DOUGH

[75] Inventors: Minoru Kageyama; Yasuo Torikata, both of Utsunomiya, Japan

[73] Assignee: Rheon Automatic Machinery Co., Ltd., Utsunomiya, Japan

[21] Appl. No.: 689,217

[22] Filed: Apr. 22, 1991

[30] Foreign Application Priority Data

Apr. 23, 1990 [JP] Japan .................. 2-107061

[51] Int. Cl.$^5$ .............................. A21D 8/02
[52] U.S. Cl. ....................... 426/19; 426/27; 426/502
[58] Field of Search ............ 426/19, 27, 502

[56] References Cited

U.S. PATENT DOCUMENTS

| 3,375,117 | 3/1968 | Schremmer . | |
|---|---|---|---|
| 3,928,646 | 12/1975 | Hartley . | |
| 4,192,636 | 3/1980 | Hayashi et al. | 426/502 X |
| 4,671,760 | 6/1987 | Hayashi | 426/502 |
| 4,946,699 | 8/1990 | Kageyama et al. | 426/19 X |
| 4,957,426 | 9/1990 | Hayashi | 426/502 X |
| 5,030,466 | 7/1991 | Kageyama et al. | 426/502 |
| 5,034,237 | 7/1991 | Suzuki | 426/311 |
| 5,039,542 | 8/1991 | Hayashi | 426/502 |
| 5,059,440 | 10/1991 | Hayashi | 426/502 |
| 5,079,014 | 7/1992 | Morikawa et al. | 426/502 |

FOREIGN PATENT DOCUMENTS

| 311240 | 4/1989 | European Pat. Off. . |
| 63-12242 | 1/1988 | Japan . |
| 2-119752 | 5/1990 | Japan . |
| 1089090 | 11/1967 | United Kingdom . |
| 90/09840 | 9/1990 | World Int. Prop. O. . |

OTHER PUBLICATIONS

JPO Abstracts, Abstracting JP59-31665, Abstract Publication Date May 31, 1984.

Primary Examiner—Joseph Golian
Attorney, Agent, or Firm—Guy W. Shoup; Partick T. Bever

[57] ABSTRACT

A method and apparatus for producing a sheet of dough, wherein powdered materials, including flour, yeast, sugar, and fats and oils, for making bread, are mixed with particles of ice, such that the particles of ice do not melt, to make them into a dough mixture. The dough mixture is formed into a continuous belt-like dough mixture having a uniform width and thickness such that the particles of ice do not melt, and then the particles of ice are melted to make the belt-like dough mixture hydrated. Finally continuous hydrated belt-like dough mixture is stretched so that a continuous sheet of dough having a gluten network is provided.

4 Claims, 4 Drawing Sheets

METHOD AND APPARATUS FOR PRODUCING A SHEET OF DOUGH

BACKGROUND OF THE INVENTION

1. Field of the Invention

This invention relates to a method and apparatus for producing a sheet of dough. It especially relates to a method and apparatus for producing a sheet of bread dough from a dough mixture that consists of powdered materials, including flour and ice.

2. Description of Prior Art

Many attempts have been made to instantly provide dough of a good quality whenever it is needed. In the prior art methods raw materials are mixed with water and kneaded to form a lump of dough. The lump of dough is extruded from an extruder, and then sheeted, cut and then shaped and fermented to produce dough products.

However, these prior art methods have several problems. Namely, the mixing and kneading process needs operators' skills in judging whether the materials are uniformly mixed with water and whether the gluten in the kneaded dough is sufficiently developed. It has been generally said that within a limited period of time the constant production of a uniform mixture of powder and liquid is difficult. The amount of water for making dough is usually less than that of powdery materials so that the powdery materials tend to gather to form a hard mass. In order to eliminate it, a long period of time for kneading is required. Once dough is kneaded, fermentation starts progressing in the dough due to the yeast contained in it. This fermentation cannot be stopped until the dough is completely baked or is frozen. Therefore, the discontinuation of fermentation before such processes means scrapping the dough. Further, in the above-mentioned kneading process, the network of the tissue structure of a well-developed gluten is liable to be destroyed due to a squeezing force exerted on the dough by the extruder. Hence, an extra process, such as a resting process, is needed to recover the lost tissue structure.

SUMMARY OF THE INVENTION

Accordingly, one of the objects of this invention is to provide an improved method and apparatus for providing a sheet of high-quality dough without causing any of the prior art problems.

Another object of this invention is to provide an improved method and apparatus for instantly and efficiently providing a sheet of dough of a high quality.

Still another object of this invention is to provide an improved method and apparatus for easily and constantly providing a sheet of dough adaptable to instantly produce high-quality dough products.

In accordance with these and other objects, this invention provides an improved method of producing a sheet of dough comprising the steps of mixing powdered materials for making bread, including flour, yeast, sugar, and fats and oils, with particles of ice, such that the particles of ice do not melt, to make them into a dough mixture composed of particles, forming the dough mixture into a continuous belt-like dough mixture having a uniform width and thickness such that the particles of ice do not melt, melting the particles of ice to make the belt-like dough mixture hydrated, and stretching the continuous hydrated belt-like dough mixture, thereby making a continuous sheet of dough and thereby generating a gluten network in the dough sheet.

In accordance with another aspect of this invention, it provides an apparatus for producing a sheet of dough comprising a mixing means for mixing powdered materials, including flour, yeast, sugar, and fats and oils, for making bread, with particles of ice, to make them into a dough mixture, a forming means for forming the dough mixture into a continuous belt-like dough mixture, a freezing chamber for holding the mixing means and the forming means in an environment such that the particles of ice do not melt, a melting chamber for melting the particles of ice, disposed adjacent and downstream of the freezing chamber, and a stretcher disposed downstream of the melting chamber.

In the method of this invention, by keeping the ice frozen and by preventing the flour from being hydrated, the above-mentioned dough mixture is kept in a powdered state until it is formed into a belt-like dough mixture. Thus, since the mixing process is carried out between all particles, namely the powdered materials are mixed with the particles of ice, they can be uniformly mixed with each other. Therefore, when the particles of ice in the belt-like dough mixture are melted, a uniformly hydrated belt-like dough mixture is obtained, in which all the ingredients, including flour, yeast, sugar, and fats and oils, are uniformly dispersed.

The hydrated belt-like dough mixture is then stretched by exerting a shearing stress on the dough mixture to make a sheet of dough so as to generate a gluten tissue structure in the sheeted dough. The dough sheet thus prepared has a well-developed gluten for producing products of a high quality.

The dough mixture remaining in the mixing and forming means can be left in the freezing chamber as it is. The preserved dough mixture can be used any time in response to need for feeding dough into an apparatus for making bread. It can also be supplied for consumers' home uses.

DESCRIPTION OF THE PREFERRED EMBODIMENT

Figure 1:
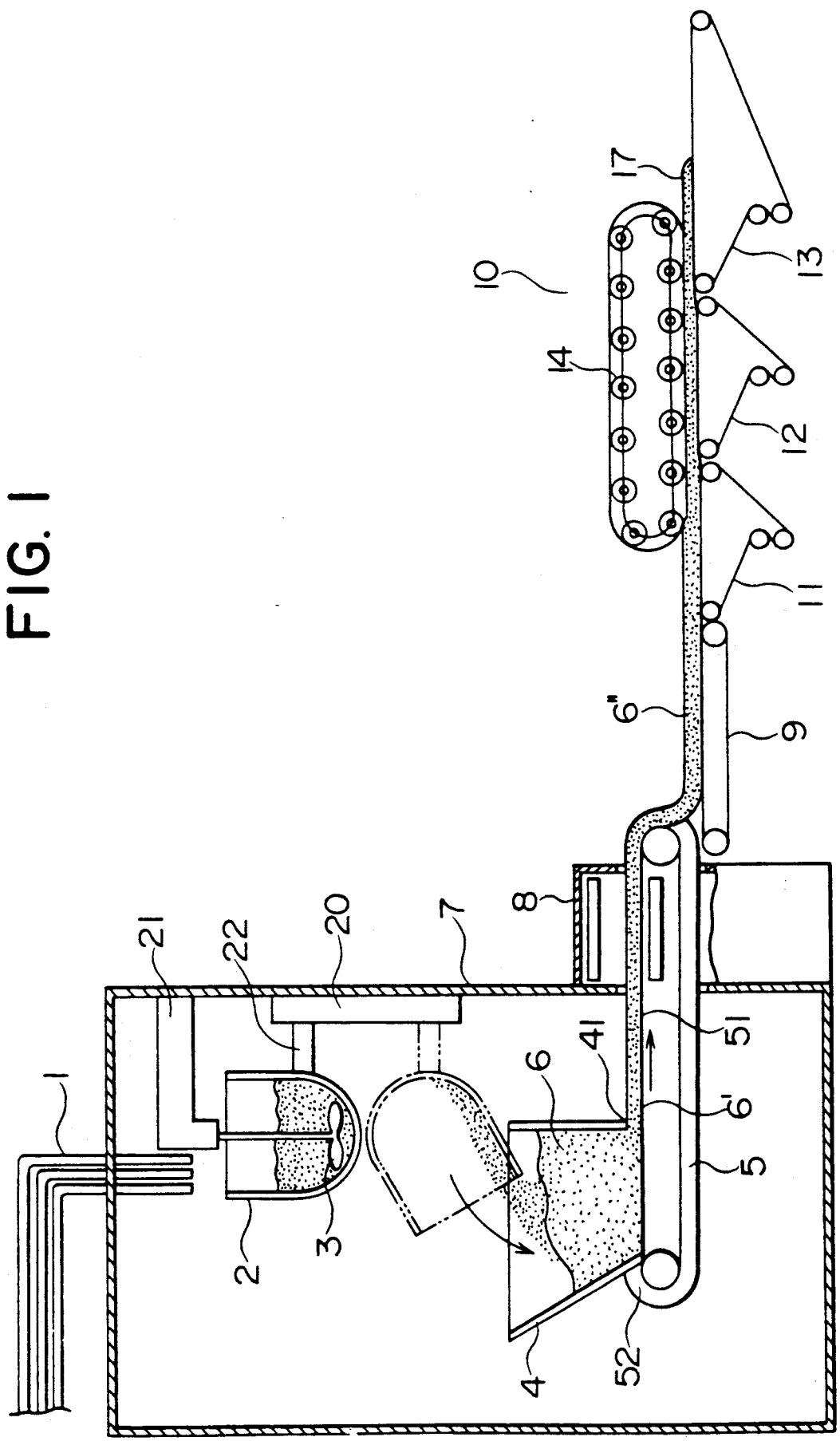
FIG. 1 is a schematic side view, partly in section, of an embodiment of the apparatus of this invention, illustrating the sequence of the steps for producing a sheet of dough of the first embodiment of the method of this invention.
Figure 2:
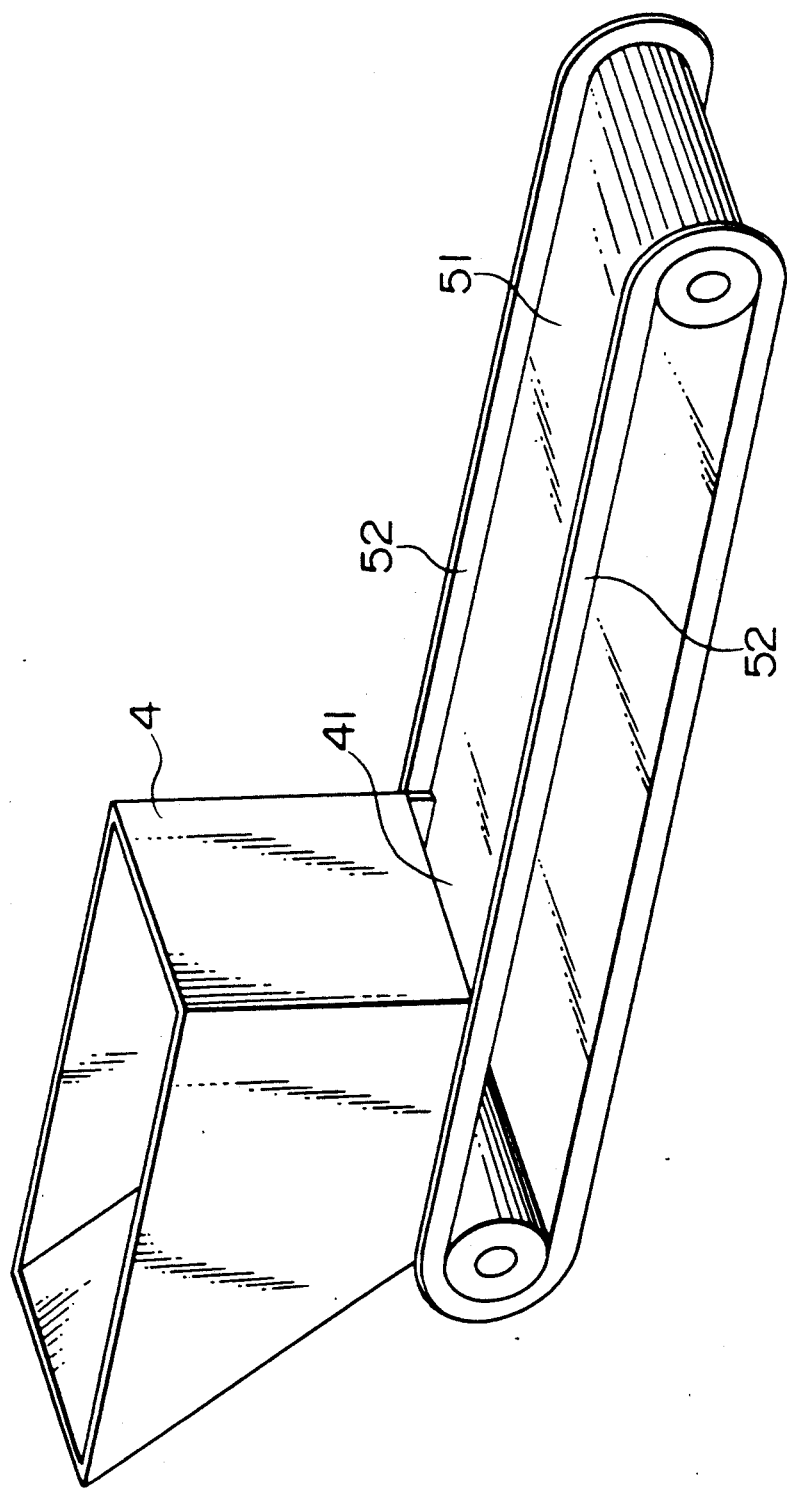
FIG. 2 is a schematic perspective view of a hopper and a forming belt conveyor, forming a part of the apparatus of this invention.

The apparatus of the first embodiment of this invention will now be explained by referring to FIGS. 1 and 2. It consists of a freezing chamber 7, a melting chamber 8, a forming conveyor 5, a transfer conveyor 9, and stretching means 10.

In the freezing chamber 7, a mixing bowl 2, a hopper 4, and a part of the forming conveyor 5, are provided.

Passages 1, for feeding powdered dough materials and ice into the mixing bowl 2, are provided at the top of the freezing chamber 7. A pair of mixing blades 3 is provided at the end of a shaft downwardly extending into the mixing bowl 2. The shaft and and bowl 2 are pivoted on brackets 21 and 22, respectively. The bracket 21 is mounted to the inner wall of the freezing chamber 7. The bracket 22 is mounted to an elevating means 20 that is fixed to the inner wall of the freezing chamber 7 so that the mixing bowl 2 can be moved up and down and turned upside down at desired angles, as illustrated by the broken lines in the figure.

The hopper 4 is provided below the mixing bowl 2 for receiving mixed materials, namely, a dough mixture 6. The forming conveyor 5 runs near the bottom of the hopper 4 and is composed of the conveying belt 51 wound around two end rolls, one of which is driven by a motor (not shown) and flexible walls 52 outwardly projecting from both the longitudinal edges of the conveying belt 51. The flexible walls 52 can be made of rubber or many metal plates abutting end-to-end so that they can be move around the ends of the conveyor 52. The hopper 4 rests on the upstream end of the conveyor 5, as shown in FIG. 2. An outlet 41 for discharging the dough mixture 6 is provided at the bottom of the hopper 4. In the freezing chamber 7 a subzero environment is maintained so that the powdered materials and the mixed dough mixture 6 are processed and stored in a powdery state. An opening is provided on the front wall of the freezing chamber 7 to transfer the formed dough mixture 6' through it. Adjacent the opening, on the outside of the freezing chamber 7, is provided a melting chamber 8. The temperature within the melting chamber 8 is maintained substantially above the freezing point. There are two methods of melting the particles of ice contained in the formed belt-like dough mixture 6', namely, one forcible and one natural. However, in this invention the forcible methods, such as the direct irradiation of a hot wind or microwaves to the formed dough mixtures 6', are effective. The melting chamber 8 works in the same manner as the above-mentioned opening for the freezing chamber 7, and another opening is provided on its front wall. The forming conveyor 5 passes through these openings for the melting chamber 8, and its downstream end projects outside. The transfer conveyor 9, for carrying the formed hydrated belt-like dough mixture 6", is provided adjacent the end of the forming conveyor 5. The transfer conveyor 9 is driven by a motor (not shown).

A stretching means 10 is provided downstream of the transfer conveyor 9. The stretching means consists of a plurality of conveyors, connected in series, that consist of an intake conveyor 11, a middle conveyor 12, and an outlet conveyor 13 and a group of rollers 14. The rolls of conveyors 11, 12, and 13 are driven by respective motors (not shown) such that the speed of each of the plurality of conveyors is stepwisely increased in the downstream direction of progress of the sheeted dough. The rollers 14 are driven by a mechanism (not shown) such that each revolves while revolving in an elliptical orbit provided over and along the plurality of conveyors 11, 12, and 13. The rollers 14 are driven by an assembly consisting of bevel gears, sprockets, and chain belts. The lower straight part of the elliptical orbit is spaced out a predetermined interval apart from the surface of the conveying belts of the plurality of conveyors 11, 12, and 13 so that the dough mixture passing therethrough is compressed and stretched.

Figure 3:
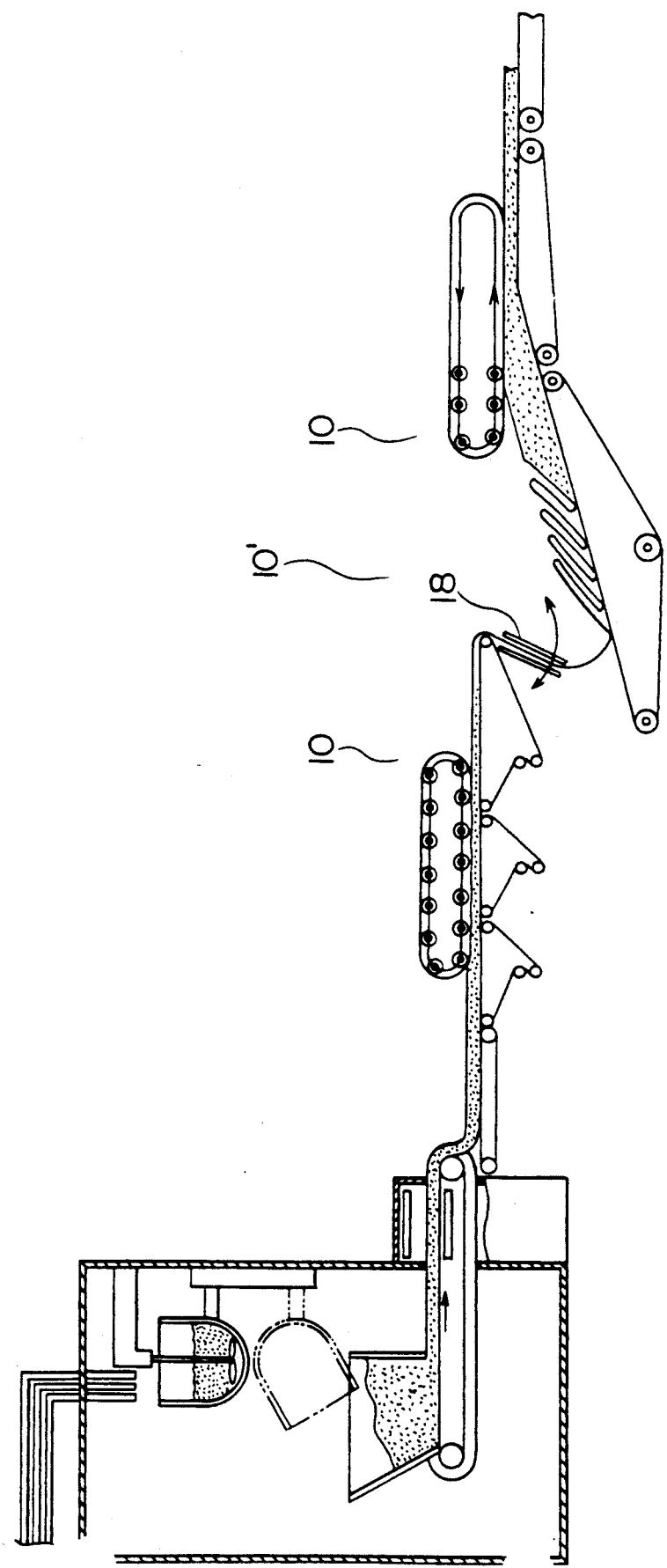
FIG. 3 is a schematic side view, partly in section, of a second embodiment of the apparatus of this invention, illustrating the sequence of the steps for producing a sheet of dough of a second embodiment of the method of this invention.
Figure 4:
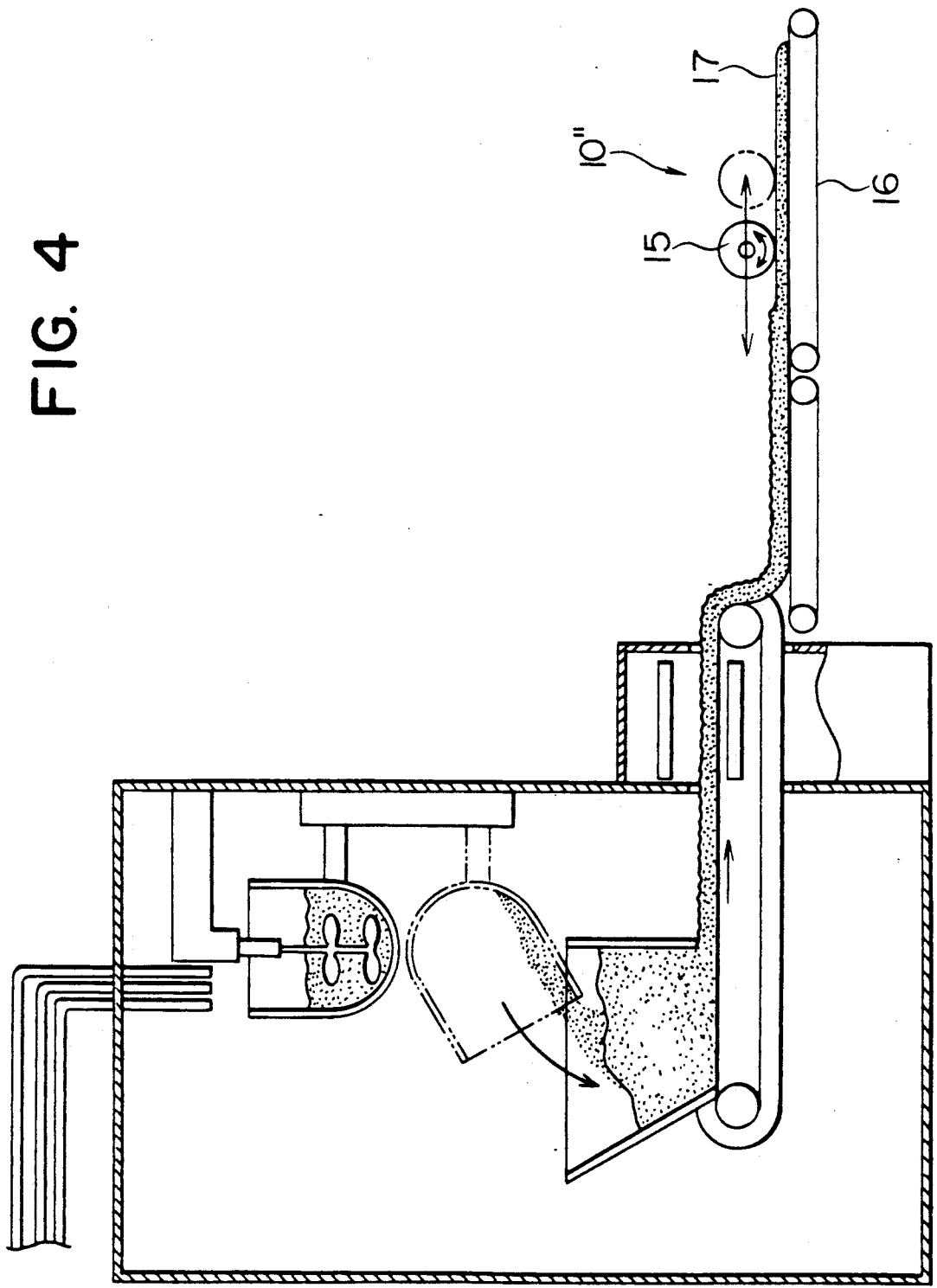
FIG. 4 is a schematic side view, partly in section, of a third embodiment of the apparatus of this invention, illustrating the sequence of the steps for producing a sheet of dough of a third embodiment of this invention.

FIG. 3 shows a stretching station 10' of the second embodiment of this invention, which contains a plurality of the stretching means 10 and a folder 18. In the stretching station 10' a predetermined length of the stretched dough mixture is continuously folded by the folder 18, and then repeatedly stretched, so that a highly-elastic bread dough with a well-developed gluten is obtained. The folder 18 is disposed adjacent the previous take-out conveyor 13. It provides an oblong channel through which the sheeted dough is passed. The channel is driven by a mechanism (not shown) to be moved in the forward and backward directions along the course of the progress of the bread dough, so that the dough discharged on the conveyor is folded as shown in the figure. The folded dough is then stretched by the second stretching means 10 to form a dough sheet. FIG. 4 shows the third embodiment of this invention, which uses another stretching means 10". This stretching means 10" consists of a roll 15 and a conveyor 16. The roll 15 reciprocates on a straight path spaced apart a certain interval apart from the surface of the conveying belt of the conveyor 16, while rolling at a speed substantially synchronized with that of the conveyor 16. The dough mixture being carried on the conveyor 16 is stretched in the direction of the progress of the dough mixture by the reciprocating movements of the roller 15.

The operation of the embodiments of this invention will now be explained. In the mixing bowl 2, after the powdered materials, including flour and other materials, are uniformly mixed with particles of ice, the mixing bowl 2 is lowered and turned upside down to discharge the dough mixture 6 into the hopper 4. The dough mixture 6 is formed into a belt-like shape by the forming conveyor 5 and then discharged from the outlet 41 of the hopper 4. Since the flexible walls 52 are provided on both sides of the forming conveyor 5, the belt-like dough mixture 6', in a powdery state, does not fall from the sides.

When the belt-like dough mixture 6' passes through the melting chamber 8, the particles of ice are thawed to make the belt-like dough mixture 6' hydrated, and the hydrated dough mixture 6" is moved onto the transfer conveyor 9. The hydrated belt-like dough mixture 6" is stretched, while its upper surface is pressed down by the rollers 14, and a shearing stress, which is generated by the differences in the speeds of conveyors 11, 12, and 13, is exerted on it. This causes a shearing deformation in the tissue structure of the dough mixture so that a gluten network is generated. Further, when the rollers 14, which revolve over a common orbit, move on the lower straight part of the orbit, they strike the dough mixture. This results in the same effect as mentioned above, and generates a gluten network.

The reciprocating roller 15, shown in FIG. 4, also shows a stretching effect that generates a shearing deformation similar to that mentioned above. Namely, the rolling movements of the roller 15, whose speed is substantially synchronized with that of the conveyor 16, cause a shearing deformation to be generated during the progress of the dough mixture.

The following table shows the formulation ratios of raw materials, namely, the ingredients for French bread dough, in an embodiment of this invention:

Ingredients (Parts by Weight)

Enriched wheat flour (12% wheat protein): 100.0
Yeast: 3.0

Sugar: 2.0
Shortening: 2.0
Dough conditioner: 1.8
Water: 55.0

The following table shows the processing conditions of an embodiment of this invention:

Processing conditions

Mixing and kneading time: 10 min
Conveying speed of intake conveyor: 4 m/min
Conveying speed of middle conveyor: 8 m/min
Conveying speed of outlet conveyor: 16 m/min
Dough thickness at intake conveyor: 50 mm
Dough thickness at outlet conveyor: 20 mm
Temperature in melting chamber: about 60-70 C.
Average particle size of flour: 100 microns
Range of particle size of ice: 20-500 microns Although the embodiments of this invention are explained relative to bread dough, they are also effective to manufacture other kinds of dough for pastry, pizzas, or noodles.

EFFECTS OF THE INVENTION

As explained above, the method and apparatus of this invention eliminate the conventionally required kneading step, and enable the instant production of a sheet of bread dough of a high quality with a uniform width and thickness. The efficiency of producing bread dough is greatly improved by this invention. This brings about a great industrial effect in the field.

We claim:

1. A method of producing a sheet of dough comprising the steps of
    mixing powdered materials, including flour, yeast, sugar, and fats and oils, for making bread, with particles of ice, such that the particles of ice do not melt, to make them into a powdered dough mixture,
    forming the powdered dough mixture into a continuous powdered belt-like dough mixture having a uniform width and thickness such that the particles of ice do not melt,
    melting said particles of ice to make a continuous hydrated belt-like dough mixture, and
    stretching the continuous hydrated belt-like dough mixture thereby making a continuous sheet of dough and thereby generating a gluten network in the dough sheet.
2. The method of claim 1, wherein the method further comprises a step of folding and then stretching the continuous dough sheet.
3. The method of claim 1, wherein the steps of mixing and forming are carried out at a temperature of below $-10°$ C.
4. The method of claim 1, wherein the fats and oils are ground from solid fats and oils.

* * * * *